US006407191B1

(12) United States Patent
Mezquita et al.

(10) Patent No.: US 6,407,191 B1
(45) Date of Patent: Jun. 18, 2002

(54) MEDIUM DENSITY ETHYLENE POLYMERS, A PROCESS TO PREPARE THESE POLYMERS AND USE OF CARBONYL GROUP CONTAINING CHAIN TRANSFER AGENTS IN THIS PROCESS

(75) Inventors: Juan Manuel Mezquita, Terneuzen (NL); Karl Zuercher, Samstagern (CH); Ronald Wevers, Terneuzen (NL)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/600,093

(22) PCT Filed: Jan. 11, 1999

(86) PCT No.: PCT/US99/00576

§ 371 (c)(1),
(2), (4) Date: Nov. 20, 2000

(87) PCT Pub. No.: WO99/35175

PCT Pub. Date: Jul. 15, 1999

(30) Foreign Application Priority Data

Jan. 12, 1998 (EP) .......................................... 98200054

(51) Int. Cl.[7] .................................................. C08F 4/28
(52) U.S. Cl. ...................... 526/227; 526/352; 526/315; 526/316; 526/219.6; 526/64; 524/272; 524/274
(58) Field of Search ............................. 526/352, 315, 526/316, 219.6, 227, 64; 524/272, 274

(56) References Cited

U.S. PATENT DOCUMENTS

| 3,129,212 A | 4/1964 | Mortimer et al. ........... 260/94.9 |
| 3,293,233 A | 12/1966 | Ridgewood et al. ........ 260/94.9 |
| 3,317,504 A | 5/1967 | Kinkel et al. ............... 260/94.9 |
| 3,334,081 A | 8/1967 | Madgwick et al. ......... 260/94.9 |
| 3,691,145 A | 9/1972 | Glerth et al. ............... 260/94.9 |
| 3,913,698 A | 10/1975 | Gogins ......................... 180/66 |
| 3,917,577 A | 11/1975 | Trieschmann et al. ..... 260/94.9 |
| 4,076,919 A | 2/1978 | Urban et al. .................... 526/64 |
| 4,085,266 A | 4/1978 | Nakai et al. .................... 526/65 |
| 4,123,600 A * | 10/1978 | Kita et al. ....................... 526/65 |
| 4,168,355 A | 9/1979 | Sonoda et al. ................. 526/64 |
| 4,382,132 A * | 5/1983 | Kelley et al. ................. 526/145 |
| 4,698,450 A | 10/1987 | Nuttens et al. .............. 585/520 |
| 4,988,781 A | 1/1991 | McKinney et al. ........... 526/68 |
| 5,037,874 A * | 8/1991 | Nuttens et al. .............. 524/275 |

FOREIGN PATENT DOCUMENTS

| DE | 108 546 | 9/1974 | ............. C08F/3/04 |
| WO | 97/17381 | 5/1997 | ........... C08F/14/18 |

OTHER PUBLICATIONS

Journal of Polymer Science: Part A–1, vol. 4, 1966, pp. 881–900.
International Search Report dated May 19, 1999 issued by the EPO acting as the International Searching Authority in PCT/US99/00576.

* cited by examiner

*Primary Examiner*—David W. Wu
*Assistant Examiner*—Ling-Siu Choi

(57) ABSTRACT

The present invention relates to an ethylene homo or copolymer having a density of between 0.923 and 0.935 g/cm$^3$, having a molecular weight distribution $M_w/M_n$ of between 3 and 10, and comprising from 0.10 to 0.50 wt. percent of units derived from a carbonyl group containing compound, based on the total weight of the homo or copolymer. In addition, the invention relates to a free radical initiation polymerization process for the preparation of medium density ethylene polymers or copolymers, comprising reacting ethylene and optionally one or more comonomers at a high pressure, conveniently between 1600 and 4000 kg/cm$^2$, and at temperatures of about 150–330° C. in a reactor system consisting of at least one autoclave reactor or of a combination of autoclave and tubular reactors, in the presence of free radical initiators and a carbonyl group containing compound. Finally, the invention relates to carbonyl group containing chain transfer agents to obtain improved polymer processing and performance properties in flat die extrusion processes and applications.

17 Claims, No Drawings

MEDIUM DENSITY ETHYLENE POLYMERS, A PROCESS TO PREPARE THESE POLYMERS AND USE OF CARBONYL GROUP CONTAINING CHAIN TRANSFER AGENTS IN THIS PROCESS

The present invention relates to medium density ethylene homo and copolymers, and more in particular to medium density LDPE-type (low density polyethylene) resins. In addition, the present invention relates to a high pressure ethylene homo or copolymerization process and to the use of carbonyl group containing chain transfer agents such as ketones or aldehydes, and especially methyl ethyl ketone (MEK) or propionaldehyde, in the polymerization process.

Medium density ethylene homo and copolymers, which polymers have a density of between 0.925 and 0.935 g/cm$^3$, are well known in the art. These known polymers can, for instance, be prepared in high pressure radical initiated polymerization processes, wherein a wide variety of different chain transfer agents can be used.

Chain transfer agents or telogens are used to control the melt flow index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of said chain. These agents can be of many different types, from saturated hydrocarbons or unsaturated hydrocarbons to aldehydes, ketones or alcohols. By controlling the concentration of the selected chain transfer agent, one can control the length of polymer chains, and, hence, the weight average molecular weight, $M_w$. The melt flow index (MFI or $I_2$) of a polymer, which is related to $M_w$, is controlled in the same way.

After the donation of a hydrogen atom, the chain transfer agent forms a radical which can react with the monomers, or with already formed oligomers or polymers, to start a new polymer chain. This means that any functional groups present in chain transfer agents, for instance carbonyl groups of aldehydes and ketones, will be introduced in the polymer chains.

A large number of chain transfer agents, for example propylene and 1-butene which have an olefinically unsaturated bond, can also be incorporated in the polymer chain, themselves, via a copolymerization reaction. This generally leads to the formation of short chain branching of respectively methyl and ethyl groups, which lowers the density of the polymers obtained.

In many processes, two types of chain transfer agents are used in order to control both the $M_w$ (and MFI) and the density of the polymers prepared.

The melt flow index of the product polymer can be controlled by varying the amount of chain transfer agent present during the polymerization, usually by mixing varying amounts of transfer agent with the monomer or the mixture of monomers prior to polymerization. Polymers produced in the presence of chain transfer agents are modified in a number of physical properties such as processability, optical properties such as haze and clarity, density, stiffness, yield point, film draw and tear strength.

The use of carbonyl group containing compounds, and especially ketones or aldehydes, such as MEK and propionaldehyde, as chain transfer agent and molecular weight regulator in high pressure polyethylene (co) polymerization processes using autoclave and tubular reactors, is well known for at least 30 years.

DE-OS-19 08 964 teaches an ethylene homopolymer preparation process using two tubular reactors in series, and using organic peroxides as radical initiators. The reaction temperatures and pressures are within the ranges of 250–340° C. and 1500–4000 kg/cm$^2$. As an example of a suitable polymerization controller MEK is mentioned. The polymer product is said to have a narrow molecular weight distribution (MWD), a good transparency and a good gloss.

In an article in the Journal of Polymer Science: Part A-1; vol 4, 881–900 (1966), Mortimer describes the use of, a.o., aldehydes such as propionaldehyde, and ketones such as MEK, as chain transfer agents in a high-pressure free-radical polymerization process.

U.S. Pat. No. 3,129,212 teaches that chemical modifiers such as propylene and MEK can be used to prepare polyethylenes having a narrow MWD and a high density.

Also, U.S. Pat. No. 3,334,081 teaches that chain transfer agents can be used to increase the density of solid polyethylenes. Among various chain transfer agents, MEK and aldehydes are mentioned.

In U.S. Pat. No. 3,317,504, a high pressure ethylene polymerization process is described using a tubular reactor and, a.o., MEK as transfer agent. The polymers obtained were said to have a density of up to 0.940 g/cm$^3$.

East German patent 108,546 teaches a high-pressure ethylene homo-, co- or terpolymerization using free radical forming initiators. As polymerization regulators, among other, MEK and propylene are mentioned, as well as a combination thereof. This document teaches the addition of chain regulators in two tubular reactor zones to reduce molecular weight fluctuations, which leads to better workability and better film forming properties.

U.S. Pat. No. 3,293,233 describes that polymers of ethylene can be obtained when certain chain transfer agents are employed in a high-pressure polymerization process. Among the huge amount of chain transfer agents, MEK is explicitly referred to.

In U.S. Pat. No. 3,691,145 a high pressure polyethylene preparation process is described using polymerization regulators. The polymerization regulators used may be "those usual in the art, such as alkanes, alkenes of more than two carbon atoms, alcohols, ethers, aldehydes, ketones or mixtures of such substances". Reference is made to the above-mentioned article of Mortimer.

U.S. Pat. No. 3,917,577 describes a continuous process for the production of ethylene homopolymers in a tubular reactor having at least two reaction zones. Ethylene, initiator and regulator are continuously introduced at the beginning of each reaction zone. It is the object of this patent to provide a multistage process giving a polyethylene having a narrower MWD. In order to achieve this, one has to use the polymerization regulators having a high C value as described by Mortimer. MEK and propionaldehyde are mentioned among the preferred regulators.

U.S. Pat. No. 4,076,919 teaches to use conventional regulators such as propylene and MEK in a high pressure two-zone tubular reactor ethylene polymerization or co polymerization process.

U.S. Pat. No. 4,085,266 teaches the same chain transfer agents in a two-zone autoclave ethylene copolymerization process. In the top zone of the autoclave reactor ethylene is polymerized at a pressure of between 1,000 and 1,800 kg/cm$^2$ and at a relatively low temperature of between 130 and 200° C., followed by a reaction in the bottom zone at a pressure in the same range and at a high temperature of between 220 and 280° C.

In U.S. Pat. No. 4,123,600, a high pressure LDPE preparation process is described using a battery of two or more autoclave reactors, which are operated in the same way as the autoclave reactor described in the previous paragraph.

In the high-pressure polymerization process described in U.S. Pat. No. 4,168,355, the melt index of ethylene homo and copolymers is taught to be affected in a conventional way by the addition of a chain transfer agent.

U.S. Pat. No. 4,988,781 teaches the production of an improved homogeneous interpolymer of ethylene and an α-olefinically unsaturated carboxylic acid or ester in a stirred autoclave. The polymer product is said to have a substantially narrow MWD, appreciably reduced levels of long-chain branching, substantially improved extrusion stability, and appreciably improved draw-down. The improvements are obtained by using a telogenic modifier. MEK is referred to as an especially preferred telogen.

When in these known processes using carbonyl group containing compounds, such as MEK or propionaldehyde, as chain transfer agent (CTA) polymer products having a medium density are prepared, the obtained polymer products usually have a narrow molecular weight distribution of less than 3.0 and contain reduced amounts of high molecular weight fractions. This is due to the high reactivity of the carbonyl group containing chain transfer agent used. In addition, these chain transfer agents have negligible copolymerization possibilities resulting in polymers having medium densities. Short chain branches due to copolymerization of the CTA are not or hardly formed.

Such polymer products having a narrow MWD are very suitable for the production of high clarity LDPE blown films, however not for cast film or extrusion coating applications, which require polymers having broade molecular weight distributions.

Further, the known processes, which in practice essentially make use of a tubular reactor, have relatively low ethylene conversions of maximally about 16–18 percent, because in order to obtain preferred medium density LDPE's, having densities of between 0.925 and 0.935 g/cm$^3$ the reactor temperature range has to be kept relatively low at values of about 100–260° C., depending on the reactor configuration. In known autoclave processes, broad molecular weight products for cast film and extrusion coating can be obtained. However, these autoclave processes normally require relatively low pressures, which means that only low concentrations of ketones or aldehydes can be used.

It is a first object of the present invention to provide ethylene homo and copolymers which have a medium density, while having a relatively broad molecular weight distribution.

It is a second object of the present invention to provide ethylene homo and copolymers for cast films and extrusion coating applications.

It is a third object of the present invention to provide ethylene homo and copolymers having a relatively high content of units derived from carboxyl group containing chain transfer agents, such as ketones and aldehydes, and especially from MEK or propionaldehyde.

It is a fourth object of the present invention to provide polymers having improved adhesion properties, even so good that the need for conventional substrate or polymer melt treatments, such as corona, flame or ozone treatment, to improve the adhesion properties is significantly reduced or even eliminated.

It is a fifth object to provide a process wherein medium density LDPE polymers can be prepared with higher ethylene conversions.

It is a sixth object of the present invention to provide a flexible process allowing to provide polymers for blown films, cast films and extrusion coatings in a polymer. density range of 0.923 to 0.935 g/cm$^3$.

It is a seventh object of the present invention to enable the application of polymer melt having a higher viscosity onto substrates.

It is an eighth object of the present invention to allow molten polymer web application with reduced air exposure.

Any other objects of the present invention will become apparent after considering the description herein-below.

The present invention provides ethylene homo or copolymers having a density of between 0.923 and 0.935 g/cm$^3$, having a molecular weight distribution $M_w/M_n$ of between 3 and 10, and comprising from 0.10 to 0.50 wt. percent of units derived from a carbonyl group containing compound, based on the total weight of the homo or copolymer.

According to a further aspect, there is provided a free radical initiation polymerization process for the preparation of medium density ethylene polymers or copolymers, comprising reacting ethylene and optionally one or more comonomers at a high pressure, conveniently between 1600 and 4000 kg/cm$^2$, and at temperatures of about 150–330° C. in a reactor system consisting of at least one autoclave reactor or of a combination of autoclave and tubular reactors, in the presence of free radical initiators and a carbonyl group containing compound, characterized in that such amounts of the carbonyl group containing compound are used so as to provide an ethylene polymer or copolymer comprising 0.15–0.50 wt. percent of carbonyl group containing compound derived units based on the weight of the total polymer and having a density of between 0.923 and 0.935 g/cm$^3$.

According to a third aspect, the present invention relates to the use of a carbonyl group containing chain transfer agent in a polymer preparation process to increase the adhesion of the polymer melt applied to a support material.

According to a fourth aspect, the present invention relates to the use of a carbonyl group containing chain transfer agent in a polymer preparation process to increase the water vapor barrier.

In yet another aspect, the present invention relates to the use of a carbonyl group containing chain transfer agent in polymer preparation process for effecting a good and shelf-life stable printability.

In accordance with the present invention it has been found that medium density ethylene homo and copolymers having relatively broad molecular weight distributions can be obtained, which polymers can suitably be designed for extrusion coating or cast film applications, by polymerizing ethylene and optionally a comonomer in the presence of relatively high amounts of a carbonyl group containing compound, such as methyl ethyl ketone or propionaldehyde, in a high pressure autoclave or autoclave-tubular reactor combinations. In this process, relatively high amounts of carbonyl groups derived from, for example, MEK or propionaldehyde are incorporated in the polymer chains. This high amount of carbonyl groups was found to result in an improved and advantageous performance behaviour of the medium density polymer product obtained.

In the process of the present invention medium density polymers can be obtained at monomer conversion rates above 20 percent, which is significantly higher than the conversion rates obtained in conventional tubular reactor polymerizations which achieve ethylene conversions of about 16–18 percent.

Further, it has been found in accordance with the present invention that the relationship of medium density and narrow molecular weight for ethylene polymers containing ketone or aldehyde derived units as observed in tubular reactors can be adjusted in the sense that medium density polymers can be obtained with broader molecular weight distributions, especially by combining an autoclave with a tubular reactor in the polymerization process, allowing the production of broad MWD polymers while maintaining a high density of between 0.923 to 0.935 g/cm$^3$.

More in detail, the present invention relates to an ethylene homo or copolymer having a density of between 0.923 and 0.935 g/cm$^3$, and a molecular weight distribution $M_w/M_n$ (the ratio of weight average molecular weight over number average molecular weight) of between 3 and 10, and comprising from 0.10 to 0.50 wt. percent of units derived from a carbonyl group containing compound, such as a ketone and an aldehyde, based on the total weight of the homo or copolymer.

The term ethylene copolymer as used in the present description and the claims refers to polymers of ethylene and one or more comonomers. Suitable comonomers to be used in the ethylene polymers of the present invention and giving the same trends in polymer properties, are, for instance, ethylenically unsaturated monomers and especially $C_{3-20}$ α-olefins, acetylenic compounds, conjugated or nonconjugated dienes, polyenes, carbon monoxide, (meth)acrylic acid, vinyl acetate, and $C_{2-6}$ alkyl acrylates.

The molecular weight distribution of ethylene polymers, ethylene homopolymers and ethylene α-olefin copolymers, is determined by gel permeation chromatography(GPC) on a Waters 150C high temperature chromatographic unit equipped with a differential refractive index detector and three columns of mixed porosity. The columns are supplied by Polymer Laboratories and are commonly packed with pore sizes of $10^3$, $10^4$, $10^5$ and $10^6$ Å. Solutions of the samples (about 0.15 percent by weight) are prepared in 1,2,4-trichlorobenzene stabilised with 200 ppm BHT. The flow rate is 1.0 milliliters per minute, unit operating temperature is 140° C. and the injection volume is 200 microliters.

The molecular weight determination with respect to the polymer backbone is deduced by using narrow molecular weight distribution polystyrene standards (for example Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, p. 621, 1968) to derive the following equation:

$$M_{polyethylene} = a^* (M_{polystyrene})^b$$

In this equation, a=0.4316 and b=1.0. Weight average molecular weight and number average molecular weight, $M_w$ and $M_n$ respectively, are calculated in the usual manner according to the following formula: $M_j = (\Sigma w_i (M_i^j))^j$ where $w_i$ is the weight fraction of the molecules with the molecular weight $M_i$ eluting from the GPC column in fraction i and j=1 when calculating $M_w$ and j=-1 when calculating $M_n$.

The melt flow index $I_2$ is determined in accordance with ASTM D-1238, condition (E) (190° C./2.16 kg).

Densities of the polymer products are determined in accordance with ASTM D-792.

The polymers of the invention preferably have a density of between 0.925 and 0.930 g/cm$^3$, and preferentially have a molecular weight distribution of between 5 and 9, and most preferably between 6 and 8.

The polymers of the present invention have a weight average molecular weight of between less than 5,000 up to 500,000 and more and preferably between 10,000 and 250,000.

In this description and the claims, the term carbonyl group containing compound is a compound capable to act as a chain transfer agent, which compound contains a —C(O)— group and in addition carbon atoms substituted with hydrogen atoms, wherein a part of the hydrogen atoms can be substituted by inert substituents or moieties. The presence of units derived from a carbonyl group containing compound, such as methyl ethyl ketone or propionaldehyde derived units, can qualitatively and quantitatively be determined using known techniques, for example by using IR spectroscopy and $^{13}C$ NMR spectroscopy techniques.

The content of units derived from the carbonyl group containing compound, and especially of methyl ethyl ketone or propionaldehyde derived units, is preferably between 0.15 and 0.40, most preferably between 0.18 and 0.30 wt. percent based on the total weight of the polymer. In the most preferred embodiment the polymers of the invention contain methyl ethyl ketone derived units.

By using carbonyl group containing compounds as chain transfer agent, carbonyl groups (—C(O)—) are introduced in the polymers formed. Without wishing to be restricted to any theory, the present inventors believe that ketones and aldehydes are incorporated in the polymers prepared in two different ways. When using an aldehyde as carbonyl group containing compound, the carbon atom of a —C(O)— group is incorporated in the backbone of the polymer. If a ketone, such as MEK, is used as the carbonyl group containing compound, a carbon adjacent to the —C(O)— group is incorporated in the polymer backbone. In that case, the polymer prepared will contain pending carbonyl group containing side chains. When using MEK, one will obtain a polymer containing —C(O)—CH$_2$ side groups. As compared with the carbonyl groups derived from aldehydes, the pending side groups are more mobile, and it is believed that these pending groups have a greater attribution to the advantageous effects obtained.

In a second aspect, the present invention relates to a free radical initiated polymerization process for the preparation of ethylene polymers or copolymers, comprising reacting ethylene and optionally one or more comonomers at a high pressure, and at temperatures of about 150–330° C. in an autoclave reactor comprising at least two reaction zones or in a combination of autoclave and tubular reactors, in the presence of free radical initiators and carbonyl group containing chain transfer agents, preferably MEK or propionaldehyde, wherein such amounts of carbonyl group containing chain transfer agent are used that an ethylene polymer or copolymer comprising 0.15–0.30 wt. percent units derived from the carbonyl group containing compounds, based on the weight of the total polymer, and having a density of between 0.923 and 0.935 g/cm$^3$, is provided.

The process of the present invention is carried out at a high pressure, which means in the context of the present invention that the reaction pressure is at least 1200 kg/cm$^2$, conveniently between 1600 and 4000 kg/cm$^2$.

The process of the present invention is a free radical polymerization process. The type of free radical initiator to be used in the present process is not critical. Free radical initiators that are generally used for such processes are oxygen, which is usable in tubular reactors in conventional amounts of between 0.0001 and 0.005 wt. percent drawn to the weight of polymerizable monomer, and organic peroxides. Preferred initiators are t-butyl peroxy pivalate, di-t-butyl peroxide, t-butyl peroxy acetate and t-butyl peroxy-2-hexanoate or mixtures thereof. These organic peroxy initiators are used in conventional amounts of between 0.005 and 0.2 wt. percent drawn to the weight of polymerizable monomers.

The amount of chain transfer agent used in the process of the present invention lies between 0.03 and 2.0 percent by weight, and preferably between 0.5 and 1.5 wt. percent drawn to the amount of monomer introduced in the reactor system. Preferably, MEK is used as the chain transfer agent. MEK has a relatively low chain transfer activity when compared to propionaldehyde and therefore the amount of carbonyl groups available during the polymerisation process is higher. Further, when using a ketone or aldehyde as chain transfer agent, the polymers obtained will have carbonyl groups at the polymer chain. As stated herein-above, it is believed that the pending carbonyl groups have a greater attribution to the advantageous effects obtained. These effects have been proven in the examples described in this document.

For high pressure, free radical initiated polymerization processes, two basic types of reactors are known from the prior art. In the first type, an agitated autoclave vessel having one or more reaction zones is used: the autoclave reactor. In the second type, a jacketed tube is used as reactor, which tube has one or more reaction zones: the tubular reactor. The beginning of a reaction zone is defined by the side injection of either initiator of reaction, ethylene, telomer, comonomer (s) as well as any combination thereof. The high pressure process of the present invention giving polyethylene homo or copolymers having the advantageous properties as found in accordance with the invention, can be carried out in an autoclave reactor having at least 2 reaction zones or in a combination of an autoclave and a tubular reactor.

In the present process, the pressure in the autoclave reactor, which contains more than one reaction zone, is relatively high as compared with prior art processes using autoclave reactors, and is preferably between 1600 and 3000 kg/cm$^2$. In the most preferred embodiment, the reactor pressure is at least 2000 kg/cm$^2$, for example 2400 kg/cm$^2$. The high pressure values used in the process of the invention have a direct effect on the amount of chain transfer agent, for example MEK or propionaldehyde, incorporated in the polymer. The higher the reaction pressure is, the more chain transfer agent derived units will be incorporated in the product.

In a preferred embodiment of the process of the invention a combination of an autoclave comprising at least two reaction zones and a conventional tubular reactor having at least one reaction zone is used. Such a conventional tubular reactor is cooled by an external water jacket and has at least one injection point for initiator and/or monomer. Suitable, but not limiting, reactor lengths can be between 500 and 1500 meters. The autoclave reactor normally has several injection points for initiator and/or monomer. In this embodiment medium density ethylene homo and copolymers having improved optical properties are obtained. The particular reactor combination used allows conversion rates of above 20 percent, which is significantly higher than the conversion rates obtained for standard tube reactors, which allow conversion rates of about 16–18 percent, expressed as ethylene conversion, for the production of medium density type of polymers. This relatively low conversion rate of about 16–18 percent is ascribed to the fact that medium density products can be prepared in a tubular reactor only by lowering the peak temperatures in the reactor considerably, which also leads to a narrow MWD of about 3.

An example of a suitable reactor system is described in for example U.S. Pat. No. 3,913,698, the contents of which are incorporated herein by reference.

When producing medium density polyethylene, the combination of a tubular with an autoclave reactors offers a broader operating window than the tubular reactor only; the produced polymers can vary from film grade with a very narrow MWD to coating type resins having a much broader MWD, by enhancing the production in the tube or in the autoclave where either a minor or a large degree of back mixing is needed. By polymerizing ethylene and optionally comonomers in an autoclave reactor, one will get a polymer product having a broad molecular weight distribution, while the polymerization in a tubular reactor will give a polymer product having a narrow molecular weight distribution; by using combinations of a tubular and autoclave reactors in series, one can, dependent on the reaction conditions and percentages of monomer polymerized in the reactors design polymer products having all kinds of intermediate molecular weight distributions. In this way the molecular weight distribution of polyethylene homo or copolymers can be manipulated with more flexibility than in a conventional autoclave reactor or in a conventional tubular reactor, while maintaining a high polymer density.

Dependent on the reactor configuration and reaction conditions used, the process of the present invention provides polymers that can be grouped into 3 fields of applications having a medium density and containing relatively high contents of units derived from the carbonyl group containing compounds used.

When using a combination of an autoclave and a tubular reactor, it is possible to provide polymers which are usable for blown film applications (MWD between 3.0 to 4.0) as class I, cast film applications (MWD between 3.5 to 6.0) as class II, and extrusion coating applications (MWD between 5.0 and 10.0) as class III, depending on the reaction conditions.

Polymers suitable for blown film applications can be obtained by controlling the temperature in the two autoclave reaction zones at between 150 and 190° C, while the inlet temperature of the monomer feed streams for both reaction zones is between 50 and 80° C.; and by controlling a maximum temperature in the tubular reactor at a value of between 220 and 260° C., while the initiation temperature is between 150 and 180° C. The polymer product obtained in such a process, wherein between 5 and 7.5 wt. percent monomer, based on the total amount of monomer introduced in the reactor, is polymerized in the autoclave reactor and between 13 and 15 wt. percent of the monomer is polymerized in the tubular reactor, has a melt flow index of between 0.5 and 4.0, and a density of between 0.929 and 0.931 g/cm$^3$. The conversion rate of the monomer is about 20–23 wt. percent.

Polymers suitable for: cast film applications can be obtained by controlling the temperature in the two autoclave reaction zones at between 150 and 190° C., while the inlet temperature of the monomer feed streams for both reaction zones is between 20 and 60° C.; and by controlling a maximum temperature in the tubular reaction zone at a value of between 250 and 300° C., while the initiation temperature is between 170 and 200° C. The polymer product obtained in such a process, wherein between 8 and 10.5 wt. percent monomer, based on the total amount of monomer introduced in the reactor, is polymerized in the autoclave reactor and between 16 and 18.5 wt. percent of the monomer is polymerized in the tubular reactor, has a melt flow index of between 1.5 and 4.0, and a density of between 0.926 and 0.929 g/cm$^3$. The conversion rate of the monomer is about 26–28 wt. percent.

Polymers suitable for extrusion coating applications can be obtained by controlling the temperature in the two autoclave reaction zones at between 190 and 220° C., while the inlet temperature of the monomer feed streams for both reaction zones is between 20 and 60° C.; and by controlling the peak temperature in the tubular reaction zone at a value of between 240 and 290° C., while the initiation temperature is between 180 and 220° C. The polymer product obtained in such a process, wherein between 10 and 12.5 wt. percent monomer, based on the total amount of monomer introduced in the reactor, is polymerized in the autoclave reactor and between 13 and 15 wt. percent of the monomer is polymerized in the tubular reactor, has a melt flow index of between 3.0 and 12, and a density of between 0.926 and 0.929 $g/cm^3$. The conversion rate of the monomer is about 24–27 wt. percent.

The amount of CO groups built in the polymer chain depends not only on process conditions (that is, if conditions used are for class I, II or III), but mainly depending on the desired MFI of the polymer being produced. A film resin produced/belonging to class I may be produced at Melt index 0.3 or up to 4.0 and the amount of chain transfer agent needed/incorporated will generally be of from 0.10 to 0.50 wt percent of units derived from a carbonyl group containing compound and based on the total weight of the homo and copolymer), depending on the desired Melt Index of the polymer being produced.

When using an autoclave reactor containing at least two reaction zones, similar products can be prepared, be it with a lower conversion rate of the monomers to be polymerized, by using the reaction conditions indicated in the previous paragraphs for the autoclave zones.

In a preferred embodiment, the process of the present invention is a high pressure process for the production of medium density polyethylene resins for extrusion coating or cast film applications.

In a very preferred embodiment, the autoclave reactor comprises at least two reaction zones, while the tubular reactor comprises at least one reaction zone. Such a typical reactor configuration makes it possible to run the reaction at relatively low maximum control temperatures of between 150 and 220° C. for the autoclave reactor and of between 230 to 290° C. for the tubular reactor in each reaction zone, giving a polymer product having a relatively high density, with high conversion rates of more than 20 wt. percent monomer.

The present invention uses carbonyl group containing compounds, and especially ketones or aldehydes, as chain transfer agents in a high concentration under such reaction conditions that a medium density polymer product is obtained and a relative high content of carbonyl group containing units are incorporated in the polymer product.

Without wishing to be bound to any theory, it is believed that the high amount of carbonyl groups present in the resins of the present invention result in the observed improved adhesion of the polymer to substrates, such as paper, aluminum, etc., in coating applications; the peel strength in such applications considerably increases. The increased adhesion provides the possibility for higher line speeds in the application equipment, with less neck-in of the coating occurring, and/or a smaller air gap. Neck-in is a term known to the person skilled in the art and is defined as one-half of the difference between the width of a polymer film at the die opening and the width of the polymer film at the nip roll. Together with a reduced neck-in, the edge bead and edge trim will become smaller, as well. The air gap is the distance between the die providing a polymer melt and the place where the polymer melt is pressed onto substrate. The air gap controls—at a given applied coating weight or thickness, melt temperature and line speed—the exposure time to air. Reducing of the air gap reduces the time for emission and heat loss from the molten polymer to the environment prior to its application onto a substrate. The possibility of using smaller air gaps, makes it possible to run at higher coating line speeds for a certain level of adhesion; or makes it possible to lower the melt temperature of the polymer product used for coating a particular substrate which has an advantageous effect on the sensory performance of the polymer product obtained by limiting the air exposure time or oxidation time. Hence, the present invention provides a process allowing to coat substrate materials with less oxidized coatings.

Further, the need for pretreatment of the polymer melt or substrate surface in order to improve the adhesion, for example a corona, flame or ozone treatment, is reduced. Such known pretreatments give rise to damages of the surface, while in addition generally the level of emissions of undesirable compounds increases.

More in particular, as compared with a standard extrusion coating resin having a Melt Index of 4.1 and polymer density of 0.921 $g/cm^3$ (PG 7004; obtainable from The Dow Chemical Company), it was found that extrusion coating resins of the present invention had about 30–40 percent better adhesion properties to paper and aluminum foil, measured at corresponding coating line speeds.

The resins produced with the process of the present invention have a reduced water vapor permeation permitting coating thickness reductions. The reduced water vapor permeation is especially desired in paper and board based packaging materials, because the structural properties of paper and board, such as package rigidity, are sensitive to moisture sorption. As compared with a standard extrusion coating resin such as PG 7004 (obtainable from the Dow Chemical Company), it was found that a polymer of the invention having a density of 0.930 $g/cm^3$ and a MFI of 3.0 showed a much better water vapor permeation behaviour. The polymer of the invention had a water vapor permeation of about 10.4 ($g/m^2$.day; 25 micrometer film thickness), while the standard extrusion coating resin gave a value of about 12.5, which is about 20 percent higher.

The resins produced with the process of the present invention further have improved printing ink adhesion, without need or with a reduced need for coating surface pretreatments. The increased density provides improved chill roll release over LDPE, thus permitting the use of high gloss chill rolls required for high quality printing onto the coated polymer surfaces.

In further aspects, the present invention hence relates to the use of a carbonyl group containing chain transfer agent in a polymer preparation process to increase the adhesion of the polymer prepared to a support material; to the use of a carbonyl group containing chain transfer agent for polymers with increased water vapor barrier thus allowing the reduction of polymer coating thickness in articles produced thereof; and to the use of a carbonyl group containing chain transfer agent to enhance printability of the polymer prepared.

Moreover, the increased polymer density provides higher mechanical strength and therefore giving the possibility to go to thinner films. In addition to that, the corresponding higher melting point and energy required to melt, provides extra heat resistance, such as heat exposure in downstream processing (for example drying, sterilization, etc.)

The polymers show an enhanced performance during the fabrication of articles thereof. For instance, the polymers produced in accordance with the present invention have an increased pin-hole resistance controlled by the melt viscosity of the melt when applied onto the substrated in the extrusion coating nip. Applying a molten polymer at a lower temperature with less pin holes while maintaining the good substrate adhesion properties described above, improves the water vapor barrier of the coating and allows reduced coating thicknesses on sensitive substrates such as paper and board.

Further, the invention makes it possible to use carbonyl group containing chain transfer agents to allow the application of molten webs of polymer with reduced heat radiation. Lower melt temperature processing offers in addition the possibility to extrusion laminate thinner thermoplastic films with a reduced risk of loss of polymer film orientation due to heat radiation from the molten polymer web.

The invention is further illustrated by means of the following, non-limiting examples.

EXAMPLE 1

In an LDPE reactor consisting of a two reaction zones stirred autoclave (AC) reactor followed by a two reaction zones tubular reactor, ethylene was polymerized under the following steady state conditions:

Reactor pressure: 2440 kg/cm$^2$;

Autoclave reactor residence time: around 55 sec

Tubular reactor residence time: around 80 sec

Tert-butyl perpivalate (TBPV) was injected as free radical initiator in each autoclave reactor zone. At the beginning of the two reactor zones of the tubular reactor, additional free radical initiator was injected.

Temperature process conditions:

Autoclave top-zone (50 percent ethylene): inlet 90° C., control 170° C.

Autoclave bottom-zone (50 percent ethylene): inlet 70° C., control 170° C.

Tube $1^{st}$ zone control: 250° C.

Tube $2^{nd}$ zone control: 252° C.

As chain transfer agent, MEK is used in an amount of 0.8 wt percent in the reactor make up ethylene feed stream equally divided over both AC reaction zones.

In this continuous process, polyethylene for blown film applications was obtained with an ethylene conversion rate of 21 percent. The polymer product had a MFI of 3.2 and a density of 0.930 g/cm$^3$. The amount of carbonyl incorporation was measured using $^{13}$C NMR and determined to be 0.19 wt percent (calculated as MEK groups in the polyethylene chain).

The polymer was measured to have a Mw/Mn value of 3.7

EXAMPLE 2

The polymer product produced in the process described in Example 1 was tested on a extrusion coating film line versus PG 7004, a typical Dow extrusion coating grade prepared in a process wherein a non carbonyl based compound is used as chain transfer agent.

The adhesion behaviour was tested with and without a pretreatment with corona. More in particular, the paper adhesion of both resins was tested in the Mullen Test. In this test, the test specimen, held between annular clamps, is subjected to an increasing pressure by a rubber diaphragm, which is expanded by hydraulic pressure at controlled rate, until the test specimen ruptures. The pressure reading at that point is recorded as the bursting strength. Bursting strength is defined as the hydrostatic pressure in kilopascals, or pounds per square inch or psi, required to produce rupture of the material when the pressure is increased at a controlled constant rate through a rubber diaphragm to a circular area, 30.5 mm (1.2 in.) diameter. The area of the material under test is initially flat and held rigid at the circumference but is free to bulge during the test (TAPPI T 403 om-91). Based on this test standard an adhesion percentage is calculated, defined as the burst strength measured from the coated side divided by the burst strength measured from the substrate side times 100. The resins were extruded at a set extruder temperature of 290° C. from a coathanger type extrusion die with a nominal die gap of 0.7 mm, onto 70 g/m$^2$ Kraftpaper in an amount of 25 g/m$^2$ in parts with in process addition of 40 micron aluminium sheets, using an air gap of 250 mm and varying line speeds in meters per minute; and at a line speed of 100 m/min, but with varying air gaps, utilizing a matt chill roll maintained at a temperature of 15 to 20° C. Subsequently, the percentage adhesion was determined. The results are given in the following tables.

TABLE 1

Paper adhesion (percent) using varying line speeds

| line speed (meter/min) | 100 | 150 | 200 | 250 |
|---|---|---|---|---|
| resin | | | | |
| example 1 | 94 | 86 | 79 | 63 |
| PG 7004 | 89 | 70 | 50 | 39 |

TABLE 2

Paper adhesion (percent) using varying air gaps

| air gap (mm) | 180 | 250 | 250(*) | 320 |
|---|---|---|---|---|
| resin | | | | |
| example 1 | 93.5 | 94 | 100 | 97 |
| PG 7004 | 62.5 | 89 | 91 | 96 |

*with corona pretreatment (8 kW)

Further the water vapor transmission was compared for the coatings applied at a speed of 100 m/min. The resin of example 1 was found to give a reduction of 30.4 percent as compared with PG 7004 (air gap 180 mm) and of 40.5 percent (air gap 250 mm) as presented in table 3.

TABLE 3

Water vapour transmission (WVTR in gr/cm2 at 38° C.)

| Resin | Air gap | WVTR | percent reduction |
|---|---|---|---|
| example 1 | 180 | 2.90 | 30.4 percent |
| PG 7004 | 180 | 4.17 | — |
| example 1 | 250 | 2.20 | 40.5 percent |
| PG 7004 | 250 | 3.70 | — |

In addition, the two types of resins (ex.1 and PG 7004; line speed 100 meters/min; 25 g/m$^2$) were applied to aluminium foil (40 $\mu$m). The adhesion of the polymer coating to aluminum foil was measured by peeling the polymer coating at a 15 mm sample width, at a peeling angle of 180 degrees and at a crosshead speed on a tensile tester of 125 mm/min. The results are shown in table 4.

TABLE 4

| | adhesion (N/15 mm) to aluminium foil | |
|---|---|---|
| air gap (mm) | 180 | 250 |
| resin | | |
| example 1 | 3.7 | 4.6 |
| PG 7004 | 1.5 | 2.9 |
| example 1 (corona) | | 3.8 |
| PG 7004 (corona) | | 2.5 |

In addition, coefficient of friction to metal was measured for both types of polymers. The results are presented in table 5.

TABLE 5

| | Coefficient of friction to metal | |
|---|---|---|
| Air gap (mm) | 180 mm | 250 mm |
| Example 1 | 0.16 | 0.18 |
| PG 7004 | 0.27 | 0.27 |

EXAMPLE 3

Example 1 was repeated, yet for the preparation of polyethylene for cast film applications using the following different steady state conditions:

Temperature process conditions:
Autoclave top-zone: inlet 45° C., control 165° C.
Autoclave bottom-zone: inlet 30° C., control 170° C.
Tube $1^{st}$ zone control: 275° C.
Tube $2^{nd}$ zone control: 275° C.
As chain transfer agent, MEK is used in an amount of 0.68 wt percent in the reactor make up ethylene feed stream, equally divided over both AC reaction zones.

In this continuous process, polyethylene was obtained in an ethylene conversion rate of 28 percent. The polymer product had a MFI of 2.2, a density of 0.928 g/cm³ and an Mw/Mn of 5.48. The amount of carbonyl incorporation was measured to be in the same level as in example 1.

EXAMPLE 4

The polymer product produced in the process described in Example 3 was tested versus SC 7641 (available from The Dow Chemical Company), a typical Dow cast film grade with a Melt Index of 2.0 and density of 0.923 g/cm³ prepared in a process wherein a non carbonyl based compound is used as chain transfer agent. Table 6 shows a comparison of these two polymers.

TABLE 6

| | Mechanical properties and coefficient of friction | |
|---|---|---|
| Resin | Example 3 | SC 7641 |
| Modulus MD | 68.7 | 62.3 |
| Modulus CD | 72.3 | 60.0 |
| Yield Tensile Strength MD | 4.84 | 3.91 |
| Yield Tensile Strength CD | 3.51 | 3.13 |
| Film/steel Coeff. of friction | 0.67 | 0.91 |

EXAMPLE 5

Example 1 was repeated, yet for the preparation of polyethylene for extrusion coating applications using the following different steady state conditions:

Temperature process conditions:
Autoclave top-zone: inlet 35° C., control 205° C.
Autoclave bottom-zone: inlet 30° C., control 195° C.
Tube $1^{st}$ zone control: 260° C.
Tube $2^{nd}$ zone control: 260° C.
As chain transfer agent, MEK is used in an amount of 0.7 wt percent in the reactor make up ethylene feed stream, equally divided over both AC reaction zones.

In this continuous process, polyethylene was obtained in an ethylene conversion rate of 25 percent. The polymer product had a MFI of 4.0 and a density of 0.927 g/cm³. The amount of carbonyl incorporation was measured to be in the same level as in example 1.

EXAMPLE 6

The polymer product produced in the process described in Example 5 was tested versus PG 7004 and PG 7008 (available from The Dow Chemical Company), both typical Dow extrusion coating grade with a Melt Index of 7.7 and a density of 0.918 gr/cm³, prepared in a process wherein a non carbonyl based chain transfer agent was used as chain transfer agent.

The resins were applied from a coathanger type of extrusion die with a nominal die gap of 0.7 mm onto 70 g/m2 Kraftpaper in an amount of 25 g/m2 with in-process addition of 40 micron aluminium foil sheets using air gaps of 180 mm and 250 mm and at a line speed of 100 m/min utilising a glossy chill roll maintained at a temperature of 15 to 20° C.

At a given wettability described by the similar melt index, tables 7a to 7c illustrate a benefit for the example 6 material on foil adhesion over LDPE, based on its improved chill roll release due to density and inherent carbonyl groups establishing improved adhesion also at lower oxidation levels controlled by melt temperature and air gap.

TABLE 7a

| | Foil adhesion 40 micron Al-foil (N/15 mm) | | |
|---|---|---|---|
| Set extruder temperature | 290° C. | 310° C. | 310° C. |
| Air gap | 250 mm | 180 mm | 250 mm |
| Example 6 | 2.88 | 3.53 | 3.65 |
| PG 7004 | 2.66 | 3.10 | 3.36 |
| percent increase | 8.3 percent | 13.5 percent | 8.6 percent |

TABLE 7b

| Foil adhesion 40 micron Al-foil (N/15 mm) | | |
|---|---|---|
| Set extruder temperature | 290° C. | 310° C. |
| Example 6 (air gap 180 mm) | 1.83 | 3.53 |
| Example 6 (air gap 250 mm) | 2.88 | 3.64 |
| PG 7008 (air gap 250 mm) | 2.20 | 1.83 |

TABLE 7c

| Foil adhesion 40 micron Al-foil (N/15 mm) | |
|---|---|
| Example 6 (180 mm air gap and 290° C.) | 1.83 |
| PG 7008 (250 mm air gap and 320° C.) | 1.83 |

Off taste to water was evaluated according to the following method. Pouches of each polymer coated aluminum foil sample are filled with approximately 1050 ml of potable water and stored during 24 hours at 30° C. in a dark air heated cabinet. A number of one liter bottles containing potable water are stored under identical conditions to be used as reference. After the exposure period, the water exposed to the polymer bags is evaluated versus the reference samples, for taste and odor properties. An amount of 40 ml of the water exposed is put into a 20 centiliter polystyrene cup and covered with a watch glass for two hours before the panel members perform the actual test. All samples are randomly placed before being offered to the panel members The panel members are requested to rate the samples, offered in random order, on a scale of 6 levels starting from 0=no off-flavour/taste up to 5=very strong off-flavour/taste. After the rating the panel members are requested to give a forced ranking order to the samples using a scale of 4 levels, starting from 1=strongest flavour/taste up to 4=weakest flavour/taste. The results of the rating taste are then evaluated statistically.

Tables 8 and 9 show the comparison of both PG 7004 and PG 7008 ersus the polymer of example 6.

Statistical comparisons with a 95 percent confidence level were performed on 25 g/m2 coatings on 40 micron aluminum foil for example 6 versus typical extrusion coating grades. Based on the mentioned aluminum foil adhesion at lower air gaps for the materials of the present invention, it is demonstrated in tables 8 and 9 that statistically significant lower off taste to water is achieved.

TABLE 8

|  | Example 6 | PG 7004 |
| --- | --- | --- |
| Set extrusion temperature | 310° C. | 310° C. |
| Air gap (mm) | 180 | 250 |
| Off taste to water | 1.95 | 2.55 |
| Number of panel members | 22 | 22 |
| Duncan range value | 0.55 | 0.55 |

TABLE 9

|  | Example 6 | PG 7008 |
| --- | --- | --- |
| Set extrusion temperature | 290° C. | 290° C. |
| Air gap (mm) | 180 | 250 |
| Off taste to water | 0.53 | 1.11 |
| Number of panel members | 19 | 19 |
| Duncan range value | 0.56 | 0.56 |

The table 10 shows the higher heat resistance of the polymers produced in these examples when compared to the standard reference polymers.

TABLE 10

Heat resistance

|  | Example 1 | PG 7004 |
| --- | --- | --- |
| Vicat (° C.) | 103 | 95 |
| Melting temp. (° C.) | 115 | 111 |
| Energy to Melt (J/g) | 149 | 132 |
|  | Example 6 | PG 7008 |
| Vicat (° C.) | 100 | 89 |
| Melting temp. (° C.) | 114 | 107 |
| Energy to Melt (J/g) | 146 | 116 |

The data presented in Table 11 shows the increase in water vapor barrier of the polymers described in example 6 versus the reference polymers. These data were measured on 25 g/m² coated papers produced using a glossy chill roll maintained at a temperature of 38° C. on 70 g/m² Kraft paper.

TABLE 11

Water Vapour Transmission (WVTR in g/m² during 24 hours)

| Resin | WVTR (g/m²/24 h) | percent vs ref. |
| --- | --- | --- |
| PG 7008 (290° C., 100 mpm, 250 mm air gap) | 15.9 | 0.0 |
| Example 6 (290° C., 100 mpm, 250 mm air gap) | 11.5 | −27.4 percent |
| Example 6 (290° C., 100 mpm, 180 mm air gap) | 12.8 | −19.1 percent |
| PG 7004 (290° C., 100 mpm, 250 mm air gap) | 14.8 | −6.9 percent |
| PG 7004 (290° C., 100 mpm, 180 mm air gap) | 14.2 | −10.7 percent |

What is claimed is:

1. An ethylene homo or copolymer having a density of between 0.923 and 0.935 g/cm³, having a molecular weight distribution $M_w/M_n$ of between 3 and 10, and comprising from 0.10 to 0.50 wt. percent of units derived from a carbonyl group containing compound, based on the total weight of the homo or copolymer.

2. The polymer according to claim 1, wherein the carbonyl group containing compound is a ketone or an aldehyde.

3. The polymer according to claim 1, wherein the carbonyl group containing compound is methyl ethyl ketone or propionaldehyde.

4. The polymer according to claim 1, having a molecular weight distribution of between 5 and 8.

5. The polymer according to claim 1, comprising from 0.15 to 0.30 wt. percent units derived from the carbonyl group, containing compound.

6. Polymers according to claim 1 permitting melt application in extrusion coating at higher melt viscosity.

7. Polymers according to claim 1 permitting a melt application in extrusion coating at lower temperatures.

8. Polymers according to claim 1 permitting melt application in extrusion coating with reduced off-taste to water.

9. A free-radical initiation polymerization process for the preparation of medium density ethylene homo or copolymers, comprising reacting ethylene and optionally one or more comonomers at a high pressure, between 1200 and 4000 kg/cm², and at temperatures of about 150–330° C. in a reactor system consisting of at least one autoclave reactor or of a combination of autoclave and tubular reactors, in the presence of free radical initiators and a carbonyl group containing compound, wherein such amounts of the carbonyl group containing compound are used so as to provide an ethylene homo or copolymer comprising 0.15–0.50 wt. percent of carbonyl group containing compound derived units based on the weight of the total polymer and having a density of between 0.925 and 0.935 g/cm³ and a molecular weight distribution $M_w/M_n$ of between 3 and 10.

10. The process according to claim 9, wherein the carbonyl group containing compound, is used in an amount of between 0.1 and 2.0 percent by weight, based on the total weight of ethylene and optional comonomers introduced in the reactor system.

11. The process according to claim 10 wherein the carbonyl group containing compound is methyl ethyl ketone.

12. The process according to claim 9 wherein the pressure used is between 1200 and 3000 kg/cm$^2$.

13. Process according to claim 9, wherein an autoclave reactor combined with a tubular reactor is used as the reactor system.

14. The process according to claim 9, further comprising the step of using a carbonyl group containing chain transfer agent such that the adhesion of the polymer prepared to a support material is increased.

15. The process according to claim 9, further comprising the step of using a carbonyl group containing chain transfer agent such that the polymer prepared has increased water vapor barrier properties.

16. The process according to claim 9, further comprising the step of using a carbonyl group containing chain transfer agent such that the polymer prepared has a reduced the coefficient of friction (COF) to metal.

17. The process according to claim 9, further comprising the step of using a carbonyl group containing chain transfer agent to improve stiffness of the polymer prepared.

* * * * *